July 20, 1948. M. CONSTANT 2,445,473
GLARE SCREEN
Filed Nov. 19, 1945
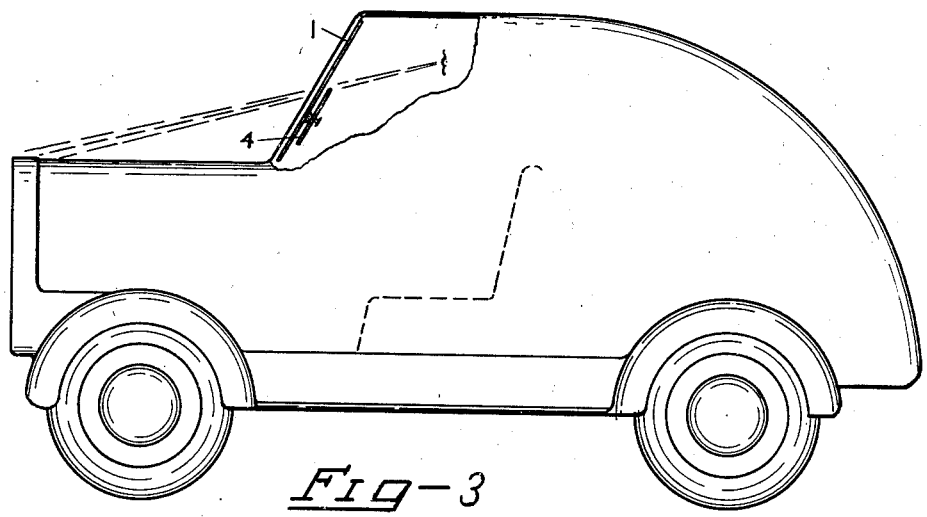
*Fig-3*
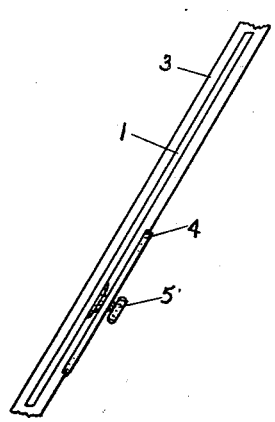
*Fig-2*
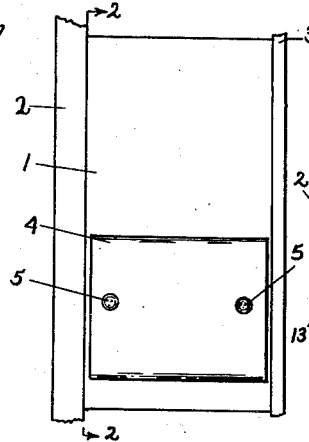
*Fig-1*
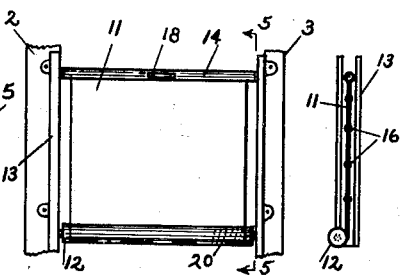
*Fig-4*  *Fig-5*
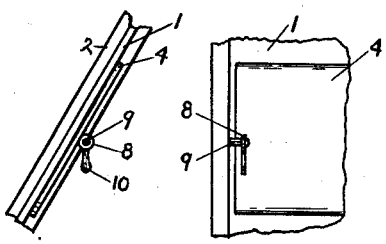
*Fig-7*  *Fig-6*
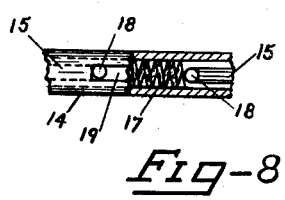
*Fig-8*
Maurice Constant, INVENTOR.
BY Bush Bush
His Attorneys.

Patented July 20, 1948

2,445,473

UNITED STATES PATENT OFFICE 2,445,473

GLARE SCREEN

Maurice Constant, Reno, Nev.

Application November 19, 1945, Serial No. 629,477

3 Claims. (Cl. 296—97)

My invention relates to glare screens for automobiles and the objects of my invention are to provide a glare screen which will protect the driver of an automobile from being blinded by the reflections from the hood of a car which he is driving, of bright sunlight or bright lamplight, will enable him to watch cars approaching from the opposite direction, which will be adjustable to fit different types and sizes of cars and windshields and which can be arranged to accommodate screen plates of different sizes and shapes.

I accomplish these objects by the means illustrated in the accompanying drawings, in which—

Figure 1 is a rear elevation of my screen as applied to the driver's side of the windshield of an automobile;

Figure 2 is a sectional elevation on the line 2—2 of Figure 1;

Figure 3 is a diagrammatic sketch showing the preferred location of the screen relative to the eyes of a supposed driver and the hood of the car;

Figure 4 is a rear elevation of an alternate form of screen and fastening therefor;

Figure 5 is a detail of one of the mounts shown in Figure 4;

Figure 6 is a fractional detail showing an alternate form of attachment for the shield; and Figure 7 is a detail showing a side elevation of the form shown in Figure 6;

Figure 8 is an enlarged detail partly in section of the form shown in Figures 4 and 5.

My invention comprises a windshield 1 which may be of any of the ordinary one or two piece types in common use and secured in place by frame bars 2 and 3 in the ordinary way. A screen plate 4 is made in the form of a flat plate which may be of either fiberboard, plastic or other opaque or semi-opaque substance, and is fastened to the lower portion of the windshield at a point where it will obstruct the lines of light as reflected from any portion of the hood of the car to the eyes of a driver as shown diagrammatically in Figure 3. It may be attached to the windshield by various means such as rubber vacuum buttons 5, the front of which may be placed in contact with the glass of the windshield and the rear of which may project through a suitable opening formed in the plate of the screen.

As an alternate form of attachment, the screen 4 may be placed in contact with the windshield 2 as shown in Figure 7 and held in place by a cam 8 pivoted to the sidebars of the windshield by pivot pins 9 adjusted by levers 10, by action of which the cam may be turned to secure the plate 4 in contact with the glass 2.

The pivot pins 9 may be secured upon the side bars of the windshield at any desired height. The screen 4 may be placed in contact with the windshield at any adjusted height within the reach of the cams 8, and thus secured at various positions in order to effect the desired screening of reflections from the hood, from the road, and light from the lamps of approaching automobiles, or glare from snow, street lights, etc.

It is obvious that where the windshield is provided with a central supporting bar, a pivoted cam may be mounted upon such central bar to hold one end of the screen. In such cases, two screens may be provided if desired or a single screen may be moved from one side to the other where both the side frames and the central frame carry such pivoted cams.

When the screen is made of a sufficiently heavy plate, one pivoted cam will be sufficient to hold it in place.

My construction will avoid all trouble from rattling, and being held in close contact with the windshield, the screen will to some extent guard against frost and will also prevent dust from settling between the screen and the windshield on either one of them.

An alternative form of securing the screen is shown in Figures 4 and 5 where a flexible screen 11 is mounted upon a roller 12 pivotally mounted in brackets 13 secured to the crossbars 2 and 3 of the windshield. The upper end of the screen 11 is secured to a tube 14 in which rods 15 are slidably mounted, the outer ends of which may project into and engage openings 16 formed in the brackets 13. The rods 15 are slidably mounted in the tube 14 and are engaged by a coiled spring 17 which acts to spread them apart so as to force their outer ends into the opening 16.

The inner ends of the rod 15 are bent at right angles and extend outwardly through a slot 19 formed in the tube 14 as indicated in Figure 8.

The spring 17 acts to keep the outer ends of the rod in engagement with the brackets 13 but permits the rods to be drawn inwardly by the inturned ends 18 of the rods so as to release the curtain and allow it to be rewound upon the roller 12. The roller 12 is fitted with an internal spring 20 shown in dotted lines in Figure 4, arranged to keep the curtain 11 drawn taut and wind it upon the roller 12 when the rods 14 are released from the bracket. With a two piece windshield, two screens may be used, but a single one will be sufficient to protect the eyes of the driver and that is all that is really necessary.

In the operation of my apparatus the screen plate is secured to the windshield at a height which will enable it to cut off all reflection from the hood of the car to the eyes of the driver, whether that reflection comes from the rays of the sun or from the lamps of approaching automobiles and it may also be arranged at a height which will protect the eyes of the driver from glare caused by the reflection from a wet pavement or water upon the pavement, of light from the lamps of an automobile approaching from the opposite direction.

Experience has shown that the direct rays of the sun are not nearly so hard to face and do not involve nearly so much danger to a driver as the rays reflected from the hood of the car or even from a wet pavement and that the dazzling effect of such reflected rays, whether from the sun or from the lamps of an approaching car, is much more dangerous and much more likely to prevent a driver seeing an approaching car than the direct rays of the sun and therefore is more likely to and does in fact cause more collisions between automobiles than the direct rays from the sun.

Various modifications may be made in the form, proportions and material of the different parts of my apparatus without departing from the spirit of my invention and I do not limit my claims to the precise forms shown in the drawings.

I claim:

1. In an automobile having a hood and a transparent front windshield mounted at the rear of the hood, a glare screen comprising a flat plate of opaque, translucent or light-resistant material in form to contact the rear face of the windshield and to lie parallel therewith, pivot pins mounted upon the side frames of the windshield carrying cams positioned to bear against and hold the screen in contact with the windshield.

2. A glare screen as described in claim 1, said cam being provided with a handle for manual adjustment thereof.

3. A glare screen as described in claim 1, said screen being of less height than the windshield and arranged to be secured at various adjusted heights thereon.

MAURICE CONSTANT.

REFERENCES CITED

The following references are of record in the file of this patent:

UNITED STATES PATENTS

| Number | Name | Date |
| --- | --- | --- |
| 1,766,162 | Young | June 24, 1930 |
| 1,929,314 | Ishii | Oct. 3, 1933 |
| 2,210,762 | Itzigson | Aug. 6, 1940 |
| 2,232,303 | Bailey | Feb. 18, 1941 |
| 2,363,762 | Wardan | Nov. 28, 1944 |